United States Patent [19]

Woodward

[11] Patent Number: 5,035,437
[45] Date of Patent: Jul. 30, 1991

[54] OUTBOARD MOTOR CARRIER

[75] Inventor: Lee A. Woodward, Racine, Wis.

[73] Assignee: Outboard Marine Corporation, Waukegan, Ill.

[21] Appl. No.: 434,895

[22] Filed: Nov. 13, 1989

[51] Int. Cl.[5] .......................... B62B 1/12; B62B 1/14
[52] U.S. Cl. ..................................... 280/40; 280/652; 280/47.131; 280/47.33; 280/DIG. 2
[58] Field of Search .............. 280/40, 646, 652, 47.24, 280/47.26, 47.33, DIG. 2, DIG. 6, 38, 42, 645, 47.131

[56] References Cited

U.S. PATENT DOCUMENTS

| | | | |
|---|---|---|---|
| D. 185,755 | 7/1959 | Klages | D14/DIG. 2 |
| 1,747,600 | 2/1930 | Reardon | 280/47.33 X |
| 2,183,066 | 12/1939 | Fields | 280/47.18 X |
| 2,326,482 | 8/1943 | Moffitt | 280/40 |
| 2,417,644 | 3/1947 | Graham | 280/47.24 X |
| 2,468,390 | 4/1949 | Binz | 280/DIG. 2 X |
| 2,507,234 | 5/1950 | Vickery | 280/DIG. 2 X |
| 2,518,803 | 8/1950 | Marvin | 280/40 |
| 2,663,474 | 12/1953 | Kelly | 280/47.24 X |
| 2,721,085 | 10/1955 | Powell | 280/645 |
| 2,756,064 | 7/1956 | Rutledge | 280/DIG. 6 X |
| 2,810,586 | 10/1957 | Troka | 280/40 |
| 2,811,942 | 11/1957 | Pineider | 115/DIG. 2 X |
| 2,835,501 | 5/1958 | Chamberlin et al. | 280/646 |
| 2,843,393 | 7/1958 | Dahlander, Sr. | 280/DIG. 2 X |
| 3,041,084 | 6/1962 | Stehman et al. | 280/47.24 |
| 3,100,048 | 8/1963 | Halverson | 280/DIG. 2 X |
| 3,189,364 | 6/1965 | Westphal | 280/DIG. 6 X |
| 3,197,226 | 7/1965 | Erlinder | 280/646 |
| 3,418,005 | 12/1968 | Allina | 280/47.26 |
| 4,294,463 | 10/1981 | Kotani | 280/646 |
| 4,754,985 | 7/1988 | Im et al. | 280/655 X |

FOREIGN PATENT DOCUMENTS

| | | | |
|---|---|---|---|
| 452544 | 11/1948 | Canada | 280/DIG. 2 |
| 622967 | 6/1961 | Canada | 280/645 |
| 1488011 | 7/1967 | France | 280/40 |

Primary Examiner—Andres Kashnikow
Assistant Examiner—Brian L. Johnson
Attorney, Agent, or Firm—Michael, Best & Friedrich

[57] ABSTRACT

A carrier adapted for transporting an outboard motor having an upper unit, the upper unit movably supporting a tiller handle and a transom bracket adapted to releasably secure the upper unit to the transom of a boat, the carrier comprising a frame adapted for travel over the ground, a false transom supported by the frame and adapted to receive the transom bracket, and a mechanism on the frame for restricting movement of the tiller handle relative to the false transom.

3 Claims, 1 Drawing Sheet

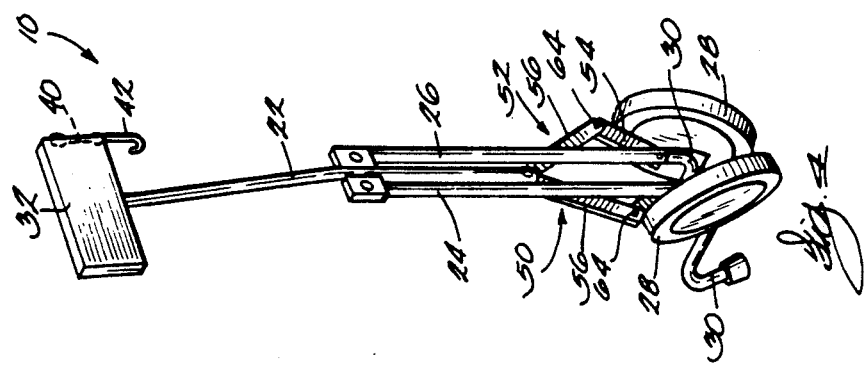
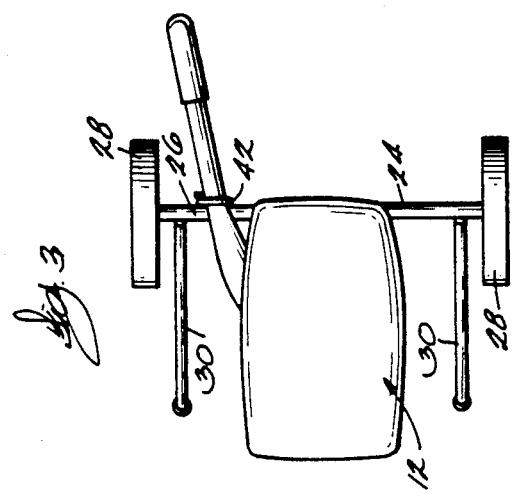
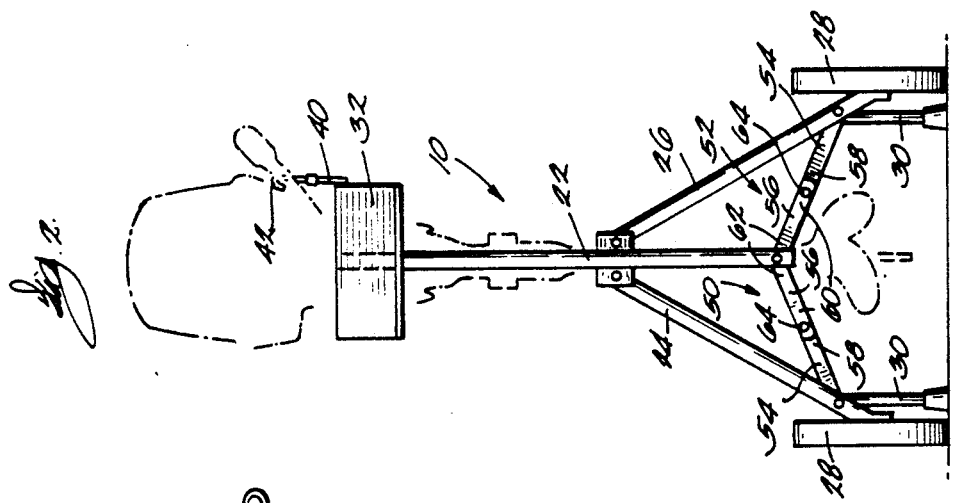
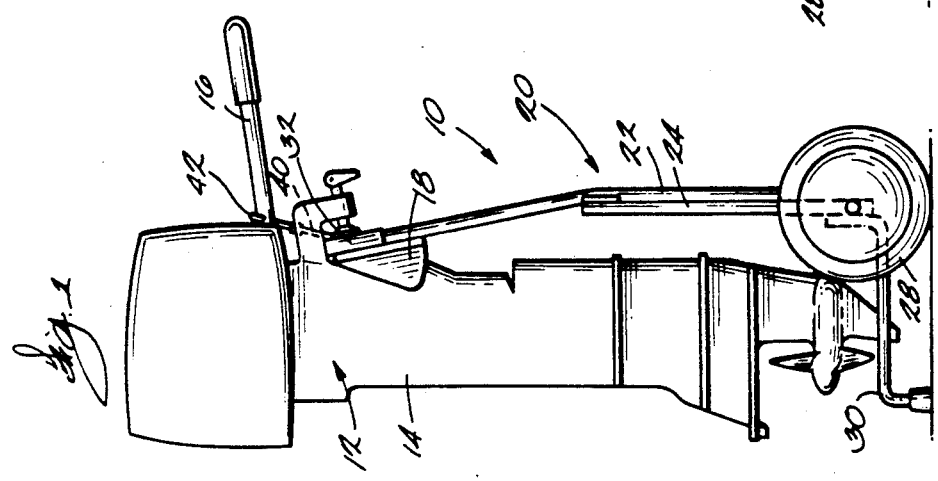

OUTBOARD MOTOR CARRIER

BACKGROUND OF THE INVENTION

The invention relates to motor carriers and more particularly to carriers for transporting outboard motors.

The use of frames adapted to support a motor for transportation over the ground is known. Furthermore, frames adapted to carry an outboard motor are also known. Attention is directed to the following U.S. Patents: U.S. Pat. No. 2,468,390 issued to Binz on Apr. 26, 1949; U.S. Pat. No. 2,518,803 issued to Marvin on Aug. 15, 1950; U.S. Pat. No. 2,810,586 issued to Troka on Oct. 22, 1957; U.S. Pat. No. 2,811,942 issued to Pineider on Nov. 5, 1957; U.S. Pat. No. 2,835,501 issued to Chamberlin et al on May 20, 1958; U.S. Pat. No. 2,843,393 issued to Dahlander, Sr. on July 15, 1958; U.S. Pat. No. 3,197,226 issued to Erlinder on July 27, 1965; and U.S. Pat. No. Des. 185,755 issued to Klages on July 28, 1959. Attention is also directed to Canadian Patent No. 452,544 issued to Pearson on Nov. 9, 1948.

SUMMARY OF THE INVENTION

The invention provides a carrier adapted for transporting an outboard motor having an upper unit, the upper unit movably supporting a tiller handle and a transom bracket adapted to releasably secure the upper unit to the transom of a boat, the carrier including a frame adapted for travel over the ground, a false transom supported by the frame and adapted to receive the transom bracket, and means on the frame for restricting movement of the tiller handle relative to the false transom.

The invention also provides a carrier adapted for transporting an outboard motor having an upper unit, the upper unit movably supporting a tiller handle and a transom bracket adapted to releasably secure the upper unit to the transom of a boat, the carrier comprising a frame adapted for travel over the ground, the frame pivotally supporting a pair of support legs such that each of the support legs is rotatable between a first operational position and a second storage position, each of the support legs rotatably supporting a wheel, locking means for selectively fixing the support legs in the operational position including a first pair of locking members and a second pair of locking members, the first pair of locking members extending between one of the support legs and the frame and the second pair of locking members extending between the other of the support legs and the frame, each pair of locking members including a first locking member having a first end pivotally connected to one of the support legs and a second end pivotally connected to the first end of the other locking member, the other locking member having a second end pivotally connected to the frame, a false transom supported by the frame and adapted to receive the transom bracket, and means on the frame for restricting movement of the tiller handle relative to the false transom including a hook member selectively engagable with the tiller handle and an elastic portion extending between the false transom and the hook member.

The invention also provides a carrier adapted for transporting an outboard motor having an upper unit, the upper unit movably supporting a tiller handle and a transom bracket adapted to releasably secure the upper unit to the transom of a boat, the carrier comprising a frame having a center post member, a pair of support legs hingedly supported by said post member, each of the support legs rotatably supporting a wheel and having a rearwardly extending portion cooperating with the wheels to support the frame in an upright position, a false transom adapted to receive the transom bracket and supported by the center post member, an elastic member movably supported by the false transom, a hook member connected to the elastic portion and selectively engagable with the tiller handle, a first pair of locking members extending between the center post member and one of the pair of support legs, the first pair of locking members including a first outer locking member having a first end pivotally connected to the one of the pair of support legs and a second end, and a first inner locking member having a first end pivotally connected to the second end of the first outer locking member and a second end pivotally connected to the center post, and a second pair of locking members extending between the center post member and the other of the pair of support legs, the second pair of locking members including a second outer locking member having a first end pivotally connected to the other of the pair of support legs and a second end and a second inner locking member having a first end pivotally connected to the second end of the second outer locking member and a second end pivotally connected to the center post.

Other features and advantages of the invention will become apparent to those skilled in the art upon review of the following detailed description, claims and drawings.

DESCRIPTION OF THE DRAWINGS

FIG. 1 is a side elevation view of an outboard motor carrier embodying the invention.

FIG. 2 is a front elevational view of the outboard motor carrier in FIG. 1.

FIG. 3 is a plan view of the outboard motor carrier in FIG. 2.

FIG. 4 is a front elevation view of the outboard motor carrier illustrated in FIG. 1 in a storage position.

Before one embodiment of the invention is explained in detail, it is to be understood that the invention is not limited in its application to the details of construction and the arrangements of components set forth in the following description or illustrated in the drawings. The invention is capable of other embodiments and of being practiced or carried out in various ways. Also, it is to be understood that the phraseology and terminology used herein is for the purpose of description and should not be regarded as limiting.

GENERAL DESCRIPTION

Shown in FIG. 1 is an outboard motor carrier 10 supporting an outboard motor 12. The outboard motor 12 is a conventional outboard motor and will not be described in detail except to the extent that the outboard motor 12 has an upper unit 14 which movably supports a tiller handle 16 and a transom bracket 18 adapted to releasably secure the upper unit 14 to the transom of a boat.

The outboard motor carrier 10 includes a frame 20 having a center post member 22. The carrier 10 also includes a pair of support legs 24, 26 which are hingedly supported by the center post member 22. In the illustrated embodiment, each of the support legs 24, 26 rotatably supports a wheel 28 and has a rearwardly extending portion 30. The rearwardly extending portions 30 cooperate with the wheels 28 on the support legs 24, 26 so as to support the frame 20 in an upright position. In the preferred embodiment, the center post member 22, the pair of support legs 24, 26 and the rearwardly extending portions 30 are rigidly constructed of a light weight, high strength material, such as aluminum tubing.

The carrier 10 also includes a false transom 32 which is supported by the frame 20 at a position near the top of the center post member 22. The false transom 32 is adapted to receive the transom bracket 18 and provides a means for mounting the outboard motor 12 on the carrier 10.

The carrier 10 also includes means for restricting movement of the tiller handle 16 relative to the false transom 32. The means for restricting movement of the tiller handle 16 includes an elastic member 40 which is movably supported by the false transom 32. The means for restricting movement of the tiller handle 16 also includes a hook member 42 connected to the elastic member 40. The hook member 42 and elastic member 40 cooperate so that the hook member 42 is selectively engagable with the tiller handle 16. The elastic member 40 has a coefficient of elasticity sufficient to allow the hook member 42 to engage the tiller handle 16, but is resilient enough so as to restrain movement of the tiller handle 16 relative to the false transom 32.

The carrier 10 also includes a first pair 50 and a second pair 52 of locking members extending between the center post member 22 and one of the pair of the support legs 24, 26. The first pair of locking members 50 extends between the center post member 22 and the first of the pair of support legs 24. The second pair of locking members 52 extends between the center post member 22 and the second support leg 26. Both the first pair 50 and the second pair 52 of locking members includes a outer locking member 54 and an inner locking member 56. The outer locking members 54 are respectively pivotally connected to the support legs 24, 26. Each of the outer locking members 54 has a second end 58. The inner locking members 56 each have respective first ends 60 which are respectively and pivotally connected to the second ends 58 of the outer locking members 54, and the inner locking members 56 have respective second ends 62 which are pivotally connected to the center post member 22.

The outer and inner locking members 54, 56 are pivotally connected such that when the outer and inner locking members 54, 56 are linearly aligned, as shown in FIG. 2, the outer and inner members 54, 56 are locked in linear alignment. Movement of the pivot 64 between the outer and inner locking members 54, 56 allows the inner and outer locking members to rotate relative to one another, as shown in FIG. 4.

The carrier 10 is operable, as shown in the illustrations, such that the hook member 42 is engagable with the tiller handle 16 such that the movement of the tiller handle 16 is restricted relative to the false transom 32. A user of the outboard motor carrier 10 can transport the outboard motor 12 mounted on the false transom 32 over the ground by using the tiller handle 16 as a handle for moving the carrier 10.

The carrier 10 is collapsible into a storage position when it is not in use. The pair of support legs 24, 26 rotate from the operational position, shown in FIG. 2, to the storage position, shown in FIG. 4, about the hinged correction to the center post member 22, when the outer and inner locking members 54, 56 rotate out of linear alignment.

Various other features of the invention are set forth in the following claims:

I claim:

1. A carrier adapted for transporting an outboard motor having an upper unit and movably supporting a tiller handle, and a transom bracket adapted to releasably secure the upper unit to the transom of a boat, said carrier comprising a frame including a center post member, a pair of support legs pivotally supported by said center post member for rotation between a first operational position and a second storage position, a pair of wheels respectively supported on said support legs, locking means for selectively fixing said support legs in said operational position, said locking means including a first pair of locking members extending between said center post member and one of said pair of support legs, said first pair of locking members including a first outer locking member having a first end pivotally connected to said one of said pair of support legs and a second end, and a first inner locking member having a first end pivotally connected to said second end of said first outer locking member and a second end pivotally connected to said center post, and a second pair of locking members extending between said center post member and the other of said pair of support legs, said second pair of locking members including a second outer locking member having a first end pivotally connected to said other of said pair of support legs and a second end, and a second inner locking member having a first end pivotally connected to said second end of said second outer locking member and a second end pivotally connected to said center post, a false transom supported by said frame and adapted to receive the transom bracket, and means for restricting movement of the tiller handle relative to said false transom, said movement restricting means including a hook member selectively engagable with the tiller handle and an elastic member extending between said false transom and said hook member.

2. A carrier adapted for transporting an outboard motor having an upper unit, the upper unit including a transom bracket adapted to releasably secure the upper unit to the transom of a boat, the carrier comprising a frame having a center post member, a pair of support legs hingedly supported by said post member, each of said support legs rotatably supporting a wheel and having a rearwardly extending fixed portion cooperating with said wheels to support said frame in an upright position, a false transom adapted to receive the transom bracket and supported by said center post member, a first pair of locking members extending between said center post member and one of said pair of support legs, said first pair of locking members including a first outer locking member having a first end pivotally connected to said one of said pair of support legs and a second end, and a first inner locking member having a first end pivotally connected to said second end of said first outer locking member and a second end pivotally connected to said center post, and a second pair of locking members extending between said center post member and the other of said pair of support legs, said second pair of locking members including a second outer locking member having a first end pivotally connected to said other of said pair of support legs and a second end and a second inner locking member having a first end pivotally connected to said second end of said second outer locking member and a second end pivotally connected to said center post.

3. A carrier as set forth in claim 2 wherein said frame pivotally supports said pair of support legs such that said pair of support legs are rotatably between a first operational position and a second storage position.

* * * * *